United States Patent [19]
Moore

[11] Patent Number: 5,389,142
[45] Date of Patent: Feb. 14, 1995

[54] METHOD AND COMPOSITION FOR MAKING AN IMPROVED FRANGIBLE BIODEGRADABLE CLAY TARGET

[76] Inventor: Patrick T. Moore, 24204 Dango Dr., Santa Clara, Calif. 91355

[21] Appl. No.: 191,477

[22] Filed: Feb. 4, 1994

[51] Int. Cl.⁶ .............................................. C04B 12/04
[52] U.S. Cl. ...................... 106/632; 106/634; 106/214; 501/141; 273/363; 273/364
[58] Field of Search .............. 106/632, 634, 416, 214; 501/141; 264/319, 320; 273/362, 363, 364

[56] References Cited

U.S. PATENT DOCUMENTS

| | | |
|---|---|---|
| D. 17,419 | 6/1987 | Cruttenden et al. |
| 292,118 | 1/1884 | Jopling. |
| 2,650,829 | 9/1953 | Jordan ............................ 273/105.4 |
| 2,653,026 | 9/1953 | Feltus ............................. 273/105.4 |
| 3,572,714 | 3/1971 | Lau ................................. 273/362 |
| 3,767,440 | 10/1973 | Olix ................................ 106/214 |
| 3,840,232 | 10/1974 | Ludwig et al. ................... 273/362 |
| 4,124,550 | 11/1978 | Kobayashi et al. ............... 273/362 |
| 4,568,087 | 2/1986 | Schreiner-Hansen ............. 273/362 |
| 4,623,150 | 11/1986 | Moehlman ....................... 273/362 |
| 4,801,150 | 1/1989 | Stevenson ........................ 273/362 |
| 5,174,581 | 12/1992 | Goodson ......................... 273/363 |
| 5,250,130 | 10/1993 | Enbe et al. ...................... 264/319 |

*Primary Examiner*—Michael Mall
*Attorney, Agent, or Firm*—Donald E. Nist

[57] ABSTRACT

The improved method of making a frangible, biodegradable clay target includes forming a plastic mixture by uniformly blending together clay, water and binder wherein the binder consists of about 1-2 percent of sodium silicate and about 0-1 percent of dextrin, by weight of the mixture, the total concentration of binder not exceeding about 2 percent, by weight of the mixture. The water is present in a concentration not in excess of 10 percent, by weight of the mixture and clay forms the remainder of the mixture. The mixture is charged into a forming press and hot pressed and dried at about 300°–400° F. to a finished, non-fired greenware frangible, biodegradable clay target. The improved composition is as set forth above.

4 Claims, 2 Drawing Sheets

METHOD AND COMPOSITION FOR MAKING AN IMPROVED FRANGIBLE BIODEGRADABLE CLAY TARGET

BACKGROUND OF THE INVENTION

1. Field of the Invention

The present invention generally relates to the shooting sports and more particularly to an improved method and composition for making a readily frangible biodegradable clay target for the same.

2. Prior Art

Conventional clay targets which are thrown into the air from hand launchers or machine launchers in skeet shooting, in trap shooting and in practicing for field shooting of birds include non-biodegradable components, for example, pitches, tars and other petroleum products generally used as binders for limestone-containing targets. Such binders are noxious and dangerous but are needed to strengthen the targets sufficiently so they can be stored, shipped and launched without prematurely breaking. Such noxious substances may penetrate the soil and adversely affect wildlife, plant life, underground water supplies and the like.

Certain of such clay targets are fired into ceramic in order to increase their strength, but such ceramic targets are in and of themselves a hazard to the environment, since they do not readily biodegrade but lie on the ground, preventing plant growth and remaining an unsightly mess.

Because clay target shooting sports are very popular, many thousands of the targets are exploded over the landscape during the course of a season of shooting at numerous shooting grounds. Accordingly, there is a need to provide an improved form of clay target which is biodegradable and, preferably bio-improveable, and which is inexpensive and aerodynamically sound.

Moreover, it should be sufficiently frangible so that it readily breaks into small fragments when hit by a shotgun pellet, in contrast to certain conventional clay and other targets which tend to deflect but not to explode or minutely fragment when hit during shooting. It is important to the shooter to be able to register a hit by the exploding target, rather than guess at a hit by a deflected but unexploded target.

SUMMARY OF THE INVENTION

The improved method and composition of the present invention provide a clay target which satisfies all the foregoing needs. The method and composition are substantially as set forth in the ABSTRACT OF THE DISCLOSURE.

Thus, the composition used in the present method consists of clay plus up to about 2 percent by weight of sodium silicate binder, with or without dextrin. The dextrin, when present, is in a concentration which does not exceed about 1 weight percent. When, both the sodium silicate and the dextrin are present in the target, their combined concentration, which is the total concentration of binder in the target, does not exceed 2 weight percent.

The composition is plastic and includes up to about 10 percent of water, by weight of the composition. The water content is lowered to about 1-2 weight percent during hot pressing of the composition to the finished greenware unfired product which is the clay target, in accordance with the present method. The method further includes molding the composition while in the hot press to a desired configuration.

Thus, the target is molded into the shape of an inverted cup with central dome and depending annular rim. The dome includes in its outer and inner surfaces sets of spaced radiating grooves. The sets are offset from each other, each groove extending up to about 40-80% of the depth or thickness of the dome. The grooves help to break up the target into small fragments when it is hit during shooting. This is further faciliated by the presence of a series of depressions, preferably half-moon shaped, on the inner surface of the rim and aligned with the inner set of grooves. Additional concentric grooves preferably are present in the outer surface of the dome to facilitate further fragmentation of the target. Those grooves and the depressions may also be about 40-80% of the depth or thickness of the portions of the target involved.

In one embodiment the dome has a central horizontal portion in the outer surface of which are embedded a plurality of plant seeds and plant fertilizer pellets to enhance the environment. Because the target is greenware and readily fragments into small pieces when hit by one or more shotgun pellets, it is readily absorbed into the soil without injuring the environment, but in fact improving it, since it promotes the support of game birds and the growth of plant life.

The thickness of the target is controlled to facilitate the desired fragmentation. In most instances, the target is about 0.1-0.2 inch in thickness. The dome may be about 0.1-0.15 inch thick, with the grooves being e.g. about 0.05 inch deep. The rim may be, for example, about 0.2 inch in thickness with the depressions being, for example, about 0.1 inch deep. Other suitable parameters may be used. The target is simple, easy to make in accordance with the present method and composition, and to store, ship and launch and is inexpensive, environmentally safe and capable of improving the environment. Further features of the invention are set forth in the following detailed description and accompanying drawings.

DRAWINGS

DETAILED DESCRIPTION

FIGS. 1-3.

Figure 1:
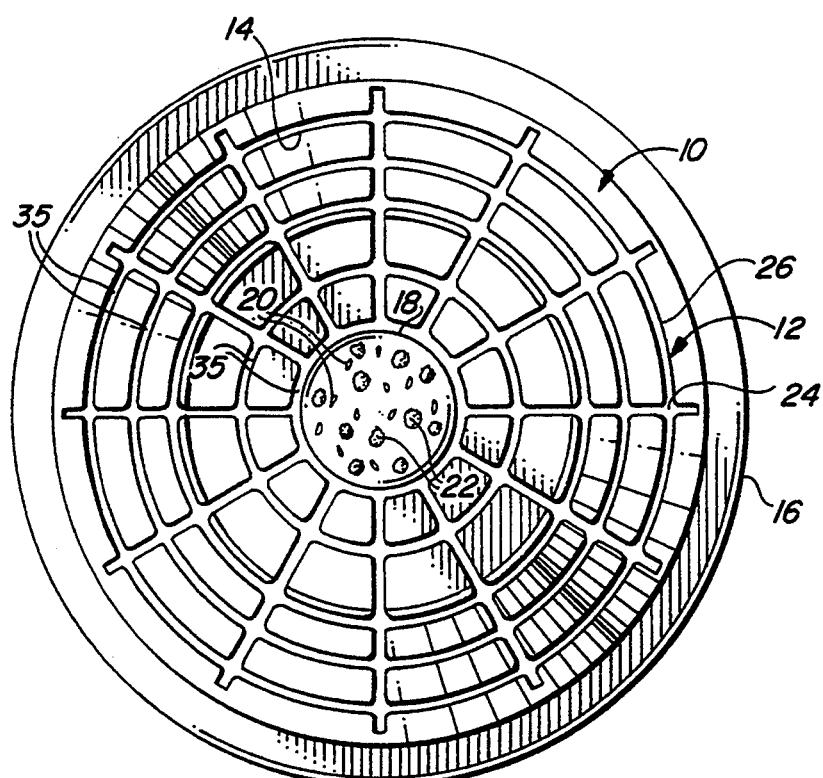
FIG. 1 is a schematic top plan view of a first preferred embodiment of the improved clay target made in accordance with the present method and composition.
Figure 2:
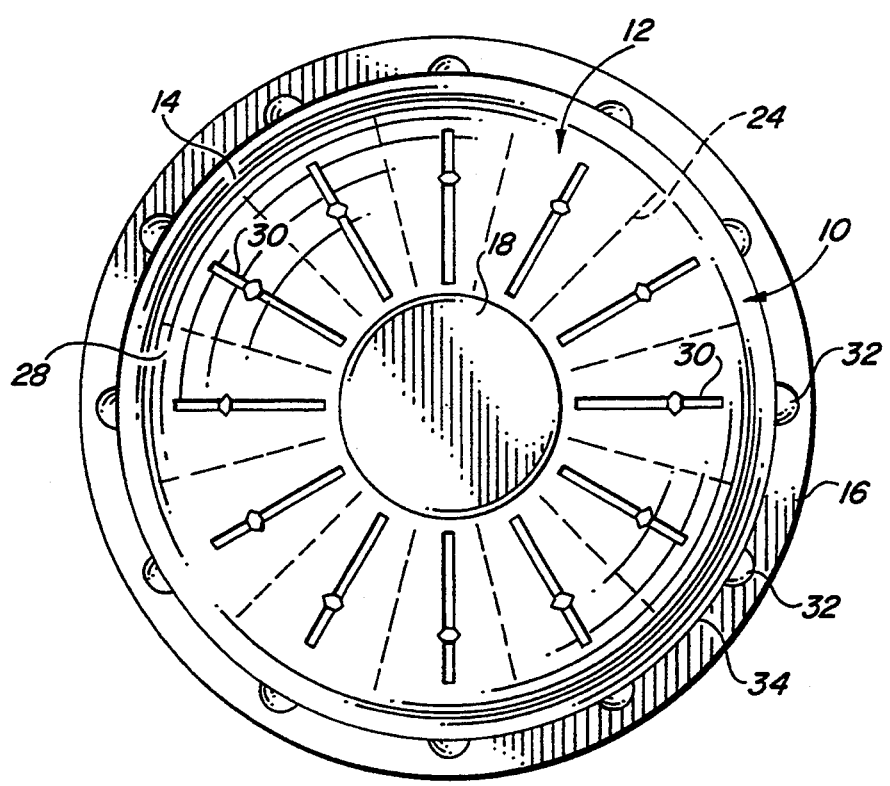
FIG. 2 is a schematic bottom plan view of the clay target of FIG. 1, with the exterior grooves of the target shown in dotted outline.
Figure 3:
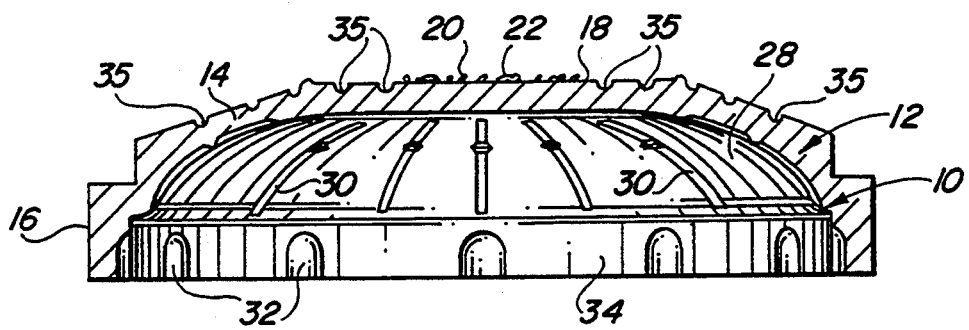
FIG. 3 is a schematic vertical cross-section of the clay target of FIG. 1.
Figure 4:
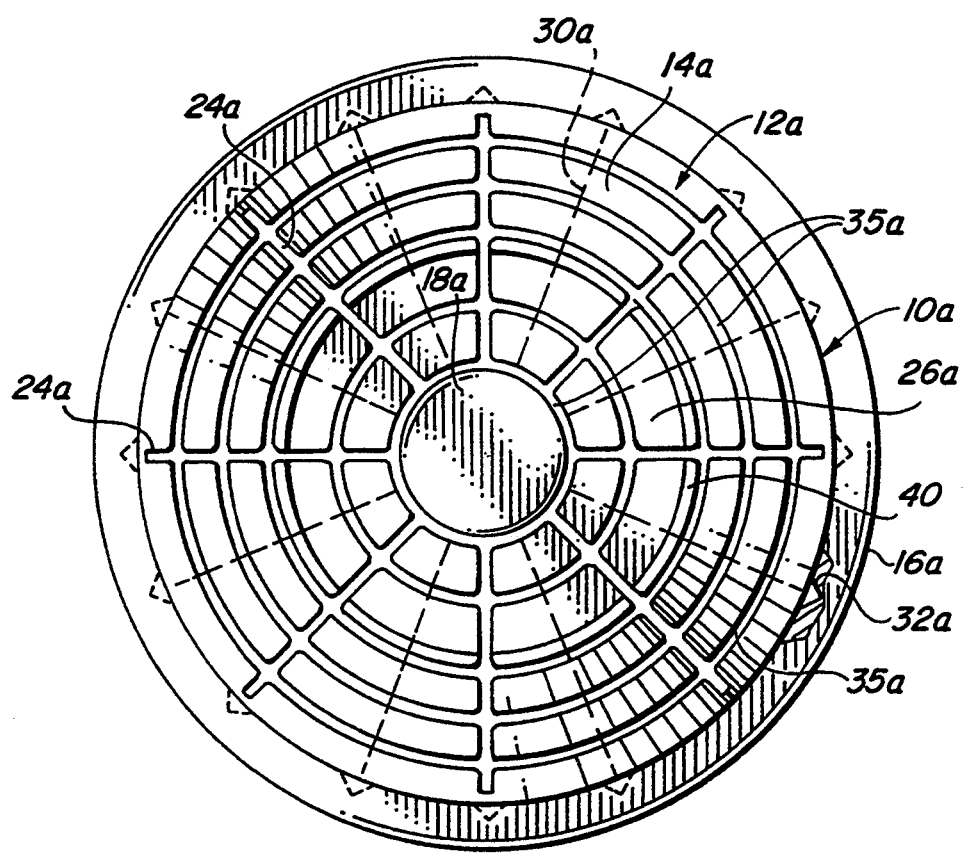
FIG. 4 is a schematic top plan view of a second preferred embodiment of the improved clay target made in accordance with the present method and composition, with the grooves in the inner surface of the dome thereof and the depressions in the inner surface of the rim thereof being shown in dotted outline.

Now referring more particularly to FIGS. 1-3 of the drawings, a first preferred embodiment of the improved clay target made in accordance with the method and composition of the present invention is schematically depicted therein.

Thus, clay target 10 is shown which comprises a target body 12 in the form of an inverted cup, having a central curved dome 14 and integral annular depending rim 16. The central portion 18 of dome 14 is horizontal and includes a plurality of plant seeds 20 and plant fertilizer pellets 22 embedded therein, in order to promote the feeding of game birds and the growth of ground cover.

Clay target 10 is a greenware product which has been dried to a low water content but which has not been fired and therefore is not ceramic. Target 10 has the following composition: a binder in the form of sodium silicate, with or without dextrin, in a concentration of about 1–2 percent by weight of the target; clay; and, a low concentration of water or moisture, usually well below 2 percent by weight. No environmentally harmful substances are present. The seeds and fertilizer pellets, when present, are in a very low concentration, usually less than about 1 weight percent. When the dextrin is present, its concentration is not above about 1 weight percent, with the sodium silicate constituting the remainder of the binder.

Any suitable conventional clay normally employed as the inert ingredient in clay targets can be used in the present target. Clays are by definition small particle size hydrous aluminum silicates which exhibit plasticity when wet. They are naturally found in certain earth deposits and have no deleterious effects on the environment. They include components such as kaolinite, halloysite and montmorillonite. Their particle size is generally less than about 0.00016 inch.

Sodium silicate, also known as water glass, is available commercially as green lumps and as powders, as well as aqueous solutions. It has strong binding properties and is environmentally safe. Dextrin is also known as starch gum and is an intermediate product formed by the hydrolysis of starch. It is a carbohydrate which is environmentally safe and has binding properties. It is commercially available.

The clay target 10 is formed in accordance with the present method by first mixing together the above-indicated components in the indicated concentrations, except that sufficient additional water is present, up to about a total of about 10 weight percent, in order to form the composition into a moldable plastic paste. Thus, the composition of the present invention which is used in the present method is as follows:

a) about 1–2 percent, by weight of the composition, of a binder consisting of about 1–2 percent of sodium silicate and 0–1 percent of dextrin, by weight of the composition;

b) up to about 10 percent, by weight of said composition, of water; and, c) the remainder consisting of clay, provided that an additional amount of plant seeds and fertilizer pellets, up to about 1 percent by weight of the composition, are optionally present in the final composition of the target, having been added, if at all, after molding of the target and before drying thereof is fully completed.

The present method comprises forming a plastic mixture by uniformly blending together the ingredients set forth above for the composition, and then charging the uniformly blended mixture into a forming press and pressing and molding and hot drying the same at about 300°–400° F. to the desired finished, non-fired greenware, frangible, biodegradable clay target having a moisture content usually of about 1–2 percent, by weight of the finished product.

In one procedure in accordance with the method, the mixing of the ingredients together is followed by sieving to remove lumps and to assure full blending, after which the mixture is allowed to stand long enough, usually about 1–24 hours to assure full absorption of the water. Thereupon, the mixture is formed into small balls, usually up to about 0.125 inch in diameter, and the balls are charged into a press and molded therein at a temperature below a ceramic-forming firing temperature into the finished dried greenware product. Typical heating temperature in the press is about 300°–400° F. Firing temperatures are avoided.

In another typical procedure in accordance with the method, the same mixture as indicated above is thoroughly blended into a smooth blend in a conventional V-cone blender over a period of about 5–10 minutes, with addition of the water and sodium silicate slowly to the clay during the mixing operation. Sieving is obviated because the blend is free of lumps. The blend can then be immediately poured into the press and hot molded therein, or can first be formed into the small balls, as in the prior procedure. Allowing the blend to stand to wait for full water absorption is unnecessary, because the blending in the V-cone blender is complete.

During the molding operation in the press, a first set of spaced radiating grooves 24 can be molded by a suitably configured mold (not shown) into the outer surface 26 of dome 14 and into the inner surface 28 thereof a second set of radiating spaced grooves 30 can be molded, with grooves 24 being offset from grooves 30 so as not to unnecessarily weaken target 10. Grooves 24 and 30 permit target 10 to readily fragment into small pieces when hit by one or more shotgun pellets. Preferably, spaced half moon-shaped depressions 32 are molded into the inner surface 34 of rim 16, depressions 32 being aligned preferably with grooves 30 (FIG. 2). Four concentric grooves 35 are disposed in surface 26 of dome 14 to further facilitate fragmentation of target 10. Additional or fewer grooves 35 can be used.

During the molding operation, that is, the hot pressing, the thickness of target body 12 is carefully controlled, due to the configuration of the mold used, so that the average thickness of dome 14 is usually about 0.1–0.15 inch, the average depth of grooves 24, 30 and 35 is usually about 40–80% of the dome thickness, rim 16 is usually about 0.2 inch thick and depressions 32 are usually about 0.1 inch thick, although they also may vary in the range of 40–80% of the rim thickness. With this configuration, target 10 remains durable enough for shipment, storage and use, but readily fragments when hit by a shotgun pellet, with both rim 16 and dome 14 disintegrating into small pieces readily absorbed by the soil.

It will be understood that the thickness of dome 14 and rim 16 and the depth of grooves 24 and 30 and depressions 32 will depend on the uses to which target 10 is to be put, its overall dimensions, etc. One form of target 10 is 4.25 inches in diameter and 1.125 inches high. A second typical target 10 can be of smaller size, for example, with a diameter of about 2.375 inches and a height of about 0.8125 inch. Alternatively, target 10 can be of larger size and somewhat different relative dimensions.

Target 10 is simple, effective, inexpensive to make and use and environmentally safe. Moreover, it enriches the environment by adding plant seeds and fertilizer to the soil. It represents a substantial improvement over conventional targets.

FIG. 4.

A second preferred embodiment of the improved clay target made in accordance with the method and composition of the present invention is schematically depicted in FIG. 3. Thus, target 10a is shown. Components thereof similar to those of target 10 bear the same numerals but are succeeded by the letter "a".

Target 10a differs from target 10 only as follows:
a) target 10a contains no plants seeds or fertilzer pellets;
b) depressions 32a are v-shaped in plan view rather than half-moon shaped and are aligned with both sets of radiating grooves 24a and 30a;
c) there are eight radiating grooves 24a instead of twelve, as in target 10, and eight radiating grooves 30a instead of twelve; moreover, the placement of grooves 24a and 30a is not totally symmetrical; and,
d) dome 14a contains a concentric circumferential upraised ridge 40, which also may or may not be present in target 10.

Target 10a functions similarly to target 10 and has the advantages of target 10, except for not enhancing the environment with plant seed and fertilizer.

Various other modifications, alterations, changes and additions can be made in the configuration of the improved target made by the method and composition of the present invention, its components, its composition and parameters.

The following specific Examples further illustrate certain features of the present method and composition:

EXAMPLE I

In a first run, the following composition was formed from the ingredients specified in Table I below:

TABLE I

| INGREDIENTS | PARTS BY WEIGHT |
| --- | --- |
| sodium silicate | 2 |
| water | 10 |
| clay | 88 |

The clay was placed in a conventional V-cone blender and blended therein for 10 minutes while water and the sodium silicate were added to form a plastic mixture. After the blending, the blend was formed into discrete balls of about 0.125 inch diameter each, and then the balls were charged into a hot press and molded therein to a greenware clay target in a suitably configured mold at 350° F. until the moisture content of the product was about 2 weight percent. The target had the configuration of the target illustrated in FIGS. 1-3 of the drawings. The average thickness of the dome of the target was 0.1 inch, while the grooves therein were about 0.05 inch deep. The rim of the target was about 0.2 inch thick and the depressions therein were moon-shaped and about 0.1 deep. Shortly before drying was complete, a mixture of plant seeds and fertilizer pellets was impressed into the central portion of the dome's outer surface. The mixture constituted about 1 weight percent of the finished product. It was found that the finished target readily fragmented into a plurality of small pieces when hit by even one shotgun pellet at a normal range of about 30-40 yards. Because the target was completely biodegradable containing no noxious ingredients, and moreover contained soil enhancing plant seeds and fertilizer, it was an optimal product. It was sufficiently strong to be shipped, stored and catapulted without breaking. In order to preserve its low moisture content, as a final step before packaging it, it was sprayed with a biodegradable shellac.

In parallel runs, the method was identical but the concentrations of ingredients for the composition were varied as follows:

| RUN # | INGREDIENTS | PARTS BY WEIGHT |
| --- | --- | --- |
| II | sodium silicate | 1.5 |
|  | dextrin | 0.5 |
|  | water | 8 |
|  | clay | 90 |
| III | sodium silicate | 1 |
|  | dextrin | 1 |
|  | water | 9 |
|  | clay | 89 |
| IV | sodium silicate | 1 |
|  | dextrin | 0.5 |
|  | water | 10 |
|  | clay | 88 |
| V | sodium silicate | 1 |
|  | water | 8 |
|  | clay | 91 |
| VI | sodium silicate | 2 |
|  | dextrin | 2 |
|  | water | 10 |
|  | clay | 86 |
| VII | sodium silicate | 10 |
|  | dextrin | 5 |
|  | water | 8 |
|  | clay | 77 |

The clay target produced in runs II through V were all suitable, being frangible and biodegradable. The targets produced in runs VI and VII were unsuitable, being too hard, due to the presence of too much binder, so that they did not fragment when struck at 30-40 yards by one or more shotgun pellets.

A large number of other parallel runs were made, utilizing various other ingredients as binders, various other inert materials instead or in addition to clay and various water concentrations. Only those targets produced within the parameters set forth in the claims appended hereto were found to be both frangible and fully biodegradable and in all respects suitable as clay targets.

EXAMPLE II

The method and composition as set forth in Example I was followed, except that a V-cone blender was substituted for by a conventional mixer which necessitated the following changes in procedure: the mixing was carried out for 3 hours; the blended mixture was then sieved to remove discrete lumps, than allowed to stand 24 hours to assure full water absorption. Runs identical to those set forth in Example I were made, with identical results.

Accordingly, the improved nature of the present method and composition and of the clay target product produced by the method and composition were clearly demonstrated. Various modifications in the method, its steps and parameters and in the present composition, its ingredients and concentrations can be made. All such modiciations as are within the scope of the appended claims form part of the present invention.

PRIOR ART STATEMENT

A preliminary patentability search has been made of the prior art. The closest prior art patents known to Applicant are listed below and one copy of each is enclosed herewith:

U.S. Pat. Nos. 2,650,829 De. 17,419 292,118 2,653,026 3,767,440 4,623,150 5,174,581

Of the above, U.S. Pat. No. 2,653,026 discloses a target with grooves on the inside but not the outside. The same is the case for U.S. Pat. De. No. 17,419 and U.S. Pat. No. 292,118. The reverse is the case for U.S. Pat. No. 2,650,829. No patents show the offset radiating grooves on the inner and outer surface of the dome and spaced aligned depressions in the rim, as in the present clay target formed by the present method.

U.S. Pat. No. 5,174,581 discloses a target formed of sugar, birdseed and water. Such a target is totally different from the present claimed composition and is generally unacceptable as a target.

U.S. Pat. No. 3,767,440 discloses a target of dextrin, clay and silicate, but in which the silicate is 80–92 percent of the composition. A totally unacceptable hard target is the result.

U.S. Pat. No. 4,623,150 discloses a target of limestone or clay which contains 4–15 weight percent of binder. The result is a target which is unuseable because it is too hard to be readily fragmented by a shotgun pellet.

In view of the above, it is believed that both the claimed composition and method of making the improved frangible clay target set forth herein are patentable.

What is claimed is:

1. An improved composition for making a frangible, biodegradable clay target, said composition comprising a uniform plastic blend of the following ingredients:
   a) 1–2 percent, by weight of said composition, of a binder consisting of about 1–2 percent of sodium silicate and 0–1 percent of dextrin, by weight of said composition;
   b) up to about 10 percent, by weight of said composition, of water; and,
   c) the remainder consisting of clay.

2. The improved composition of claim 1 wherein said dextrin is about 0.5 percent and said sodium silicate is about 1.5 percent, by weight of said composition.

3. The improved composition of claim 1 wherein said dextrin is about 1 percent and said sodium silicate is about 1 percent by weight of said composition.

4. The improved composition of claim 1 wherein said dextrin is absent from said composition and wherein said sodium silicate is 2 percent by weight of said composition.

* * * * *